United States Patent [19]
Zocholl

[11] 4,204,237
[45] May 20, 1980

[54] SOLID STATE TRANSFORMER DIFFERENTIAL RELAY

[75] Inventor: Stanley E. Zocholl, Holland, Pa.

[73] Assignee: Gould Inc., Rolling Meadows, Ill.

[21] Appl. No.: 965,141

[22] Filed: Nov. 30, 1978

[51] Int. Cl.² .......................... H02H 3/28; H02H 7/04
[52] U.S. Cl. ........................................ 361/36; 361/87
[58] Field of Search ...................... 361/36, 35, 87, 86, 361/78, 84, 85

[56] References Cited

U.S. PATENT DOCUMENTS

| | | | |
|---|---|---|---|
| 3,323,016 | 5/1967 | Andersson | 361/36 |
| 3,617,812 | 11/1971 | Deter | 361/87 |
| 3,974,423 | 10/1976 | Ulyanitsky et al. | 361/87 |

FOREIGN PATENT DOCUMENTS 600656  4/1978  U.S.S.R. .................... 361/36

OTHER PUBLICATIONS

INSPEC, DIN S60430201J, "A Three-Phase Differential Relay for Transformer Protection", by Einvall et al., source IEEE Transactions on Power, vol. PAS-94, No. 6, pp. 1971-1980, Nov.-Dec. 1975.

*Primary Examiner*—Patrick R. Salce
*Attorney, Agent, or Firm*—Ostrolenk, Faber, Gerb & Soffen

[57] ABSTRACT

A transformer differential relay monitors the current flowing through the primary and secondary windings of a power transformer and disconnects the transformer from a power source feeding the transformer whenever the magnitudes of these currents indicate a fault condition in the transformer. First and second current transformer generate primary and secondary winding voltage signals representative of the magnitude of the current flowing through the power transformer primary and secondary windings, respectively. A solid state restraint signal generator is responsive to the primary and secondary winding voltage signals and generates a restraint signal representative of the magnitude of the larger of the primary and secondary winding currents, respectively, at each measurement instant. An operate signal generator is responsive to the primary and secondary winding voltage signals and generates an operate signal representative of the magnitude of the vector sum of the currents flowing through the power transformer primary and secondary windings. Finally, means are provided for disconnecting the power transformer from the power source when the magnitude of the operate signal operates above a predetermined percentage of the restraint signal.

16 Claims, 8 Drawing Figures

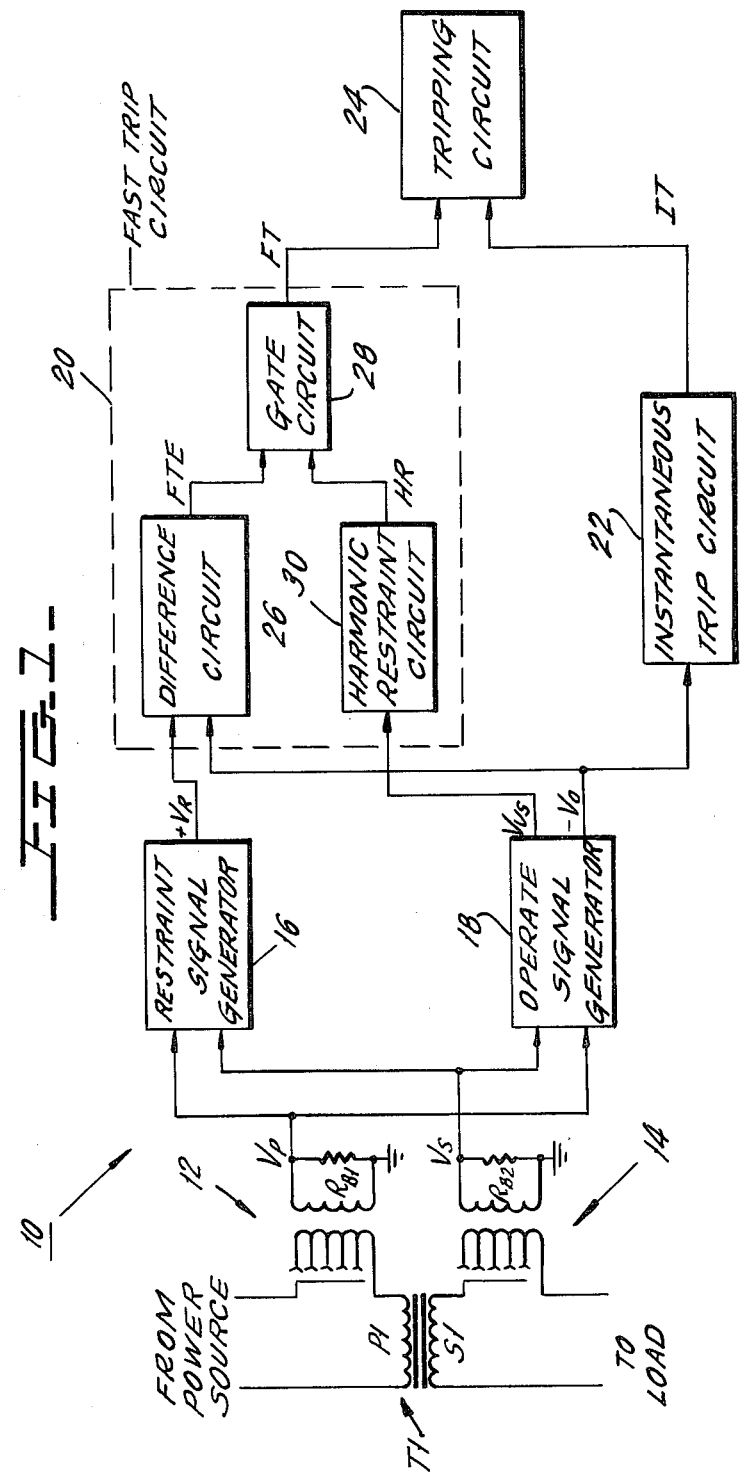

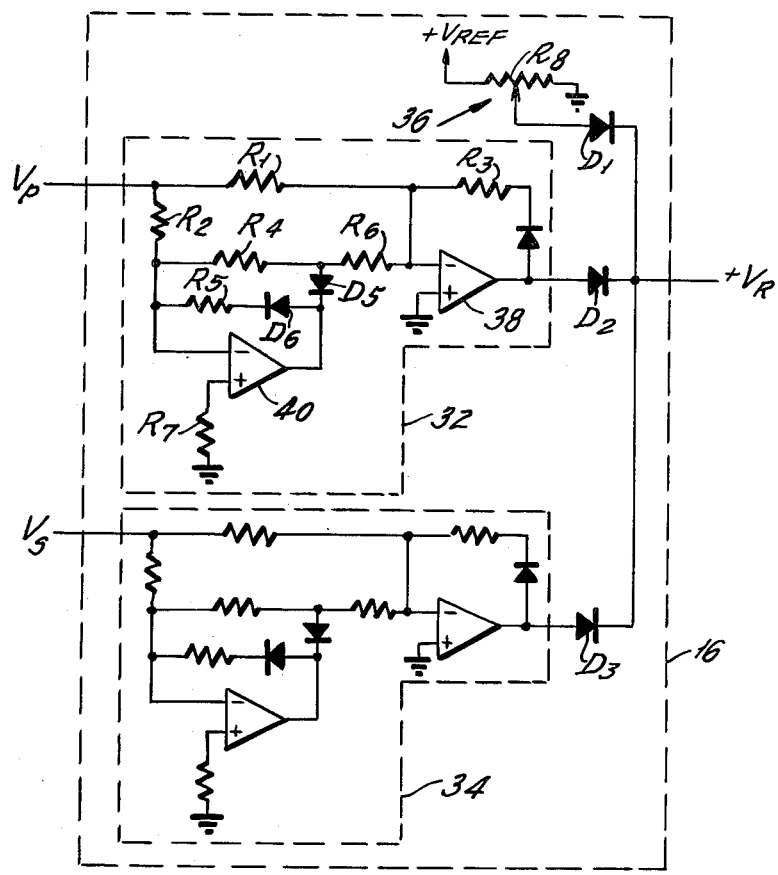

SOLID STATE TRANSFORMER DIFFERENTIAL RELAY

BACKGROUND OF THE INVENTION

The present invention is directed towards a transformer differential relay. More particularly, the present invention is directed towards a transformer differential relay which monitors the current flowing through the primary and secondary windings of a power transformer and disconnects transformer from a power source feeding the transformer whenever the magnitudes of these currents indicate a fault condition in the transformer. A fault condition is detected whenever the magnitude of an operate signal (representative of the magnitude of the vector sum of the primary and secondary winding currents) reaches a first predetermined percentage of a restraint signal (representative of the magnitude of the larger of the primary and secondary winding currents).

While transformer differential relays of the foregoing type are generally known, these relays utilized a plurality of expensive and bulky voltage transformers to generate the restraint and operate signals. Typically, the restraint signal is generated by a pair of series-connected restraint transformers whose primary windings receive primary and secondary current signals of opposite polarity and respectively proportional in magnitude to the currents in the primary and secondary windings of the power transformer being monitored. These current signals are derived via a pair of current transformers connected in series with the primary and secondary windings of the power transformer. The secondary windings of each of the restraint transformers are connected to full-wave diode bridges whose outputs are connected in parallel so as to generate a restraint signal representative of the larger of the secondary and primary winding currents.

The operate signal is typically generated by an operate transformer whose primary winding is coupled between an intermediate tap of the primary windings of the two restraint transformers and ground so as to form a T-connection therewith. As such, the primary winding of the operate transformer receives the primary and secondary current signals in an additive manner. The secondary winding of the operate transformer is connected to a full-wave diode bridge whose output represents the operate signal. The operate and restraint signals are then compared by a polarized relay which derives a percentage differential characteristic. When the operate current rises above the predetermined percentage of the restraint current, the relay disconnects the power transformer from the power source.

The use of restraint and operate transformers in the foregoing prior art differential relay requires a complex interconnection of tap blocks to conserve the necessary T-connection. Additionally, the use of conventional bridge diode rectifiers results in at least a fixed voltage drop across the rectifiers. As a result, the magnitude of the restraint and operate signals must be sufficiently high to make this fixed voltage drop insignificant. This leads to a large signal operation and adversely affects the size of the transformers. Accordingly, the prior art differential relays are bulky, heavy and require complex tap block interconnections.

BRIEF DESCRIPTION OF THE INVENTION

To overcome the foregoing drawbacks, the present invention replaces the restraint and operate transformers of the prior art relays with solid state restraint and operate signal generators. Each of these signal generators utilize solid state rectifier circuits which insure that the magnitude of the restraint and operate signals are directly proportional to the primary and secondary winding currents of the power transformer and do not include the fixed voltage offset which was caused by the use of diode bridges in the prior art relays. As a result of these features, the differential relay of the present invention is capable of small signal operation and is significantly more accurate than the prior art relays. Additionally, the complex interconnections of the prior art relays are avoided and the bulk of the relays is significantly reduced.

Briefly stated, the transformer differential relay of the present invention monitors the magnitude of the currents in a primary and a secondary winding of a power transformer and disconnects the power transformer from a power source supplying the power transformer when the relative magnitude of the currents indicate the presence of an internal fault in the power transformer. The transformer relay of the present invention comprises:

first current transformer means for generating a primary winding voltage signal representative of the magnitude of the current flowing through the power transformer primary windings;

second current transformer means for generating a secondary winding voltage signal representative of the magnitude of the current flowing through the power transformer secondary winding;

a solid state restraint signal generator responsive to the primary and secondary winding voltage signals for generating a restraint signal representative of the magnitude of the larger of the primary and secondary currents, respectively, at each measuring instant;

an operate signal generator responsive to the primary and secondary winding voltage signals for generating an operate signal representative of the magnitude of the vector sum of the currents flowing through the power transformer primary and secondary windings; and means for disconnecting the power transformer from the power source when the magnitude of the operate signal rises above a pre-determined percentage of the restraint signal.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a block diagram of a transformer differential relay constructed in accordance with the principles of the present invention.

FIG. 2 is a circuit diagram of the restraint signal generator of FIG. 1.

FIG. 3 is a circuit diagram of the operate signal generator of FIG. 1.

FIG. 4 is a circuit diagram of the difference circuit of FIG. 1.

DETAILED DESCRIPTION OF THE PREFERRED EMBODIMENT

Figure 5:
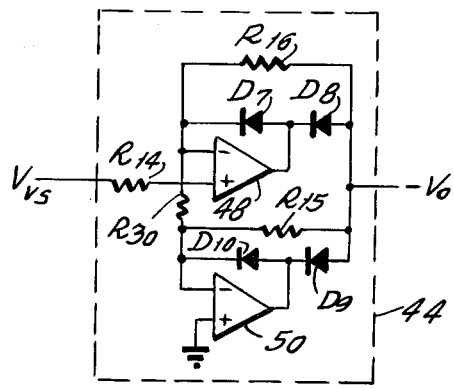
FIG. 5 is a circuit diagram of the zero drop rectifier of the circuit of FIG. 3.

Referring now to the drawings wherein like numerals indicate like elements, there is shown in FIG. 1 a block diagram of a solid state transformer differential relay constructed in accordance with the principles of the present invention and designated generally as 10. Relay 10 monitors the currents in the primary and secondary windings P1, S1, respectively, of power transformer T1 and disconnects the transformer from a power source (not shown) feeding the transformer whenever the magnitudes of these currents indicate a fault condition in the tranformer. A fault condition is detected whenever the magnitude of an operate signal $V_O$ (representative of the magnitude of the vector sum of the primary and secondary winding currents) reaches a first predetermined percentage of a restraint signal $V_R$ (representative of the instantaneous magnitude of the larger of the primary and secondary winding currents).

In order to monitor the magnitude of the currents in the primary and secondary windings of transformer T1, relay 10 first converts these currents into primary and secondary voltages $V_P$ and $V_S$. These voltages are generated by input current transformers 12 and 14 which are connected to the primary and secondary windings of transformer T1, respectively. Each of the transformers 12, 14 are identical in construction and includes a multi-tapped primary winding coupled in series with windings P1, S1, respectively, and a secondary winding connected across burden resistor $R_{B1}$, $R_{B2}$, respectively. By connecting the appropriate tap of each primary winding, it is possible to insure that the magnitude of voltages $V_P$ and $V_S$ are substantially identical when transformer T1 is operating properly. So connected, the multi-tapped windings of transformers 12, 14 serve to compensate for the variation in the number of turns in the primary and secondary windings of the power transformer T1.

The restraint and operate signals $V_R$, $V_O$ are generated by restraint and operate signal generators 16, 18, respectively, which each receive the primary and secondary voltages $V_P$ and $V_S$. The preferred structure of restraint signal generator 16 is illustrated in FIG. 2. As shown therein, restraint signal generator perferably comprises a pair of solid state full wave rectifiers 32, 34 and a minimum restraint signal generating circuit 36. Minimum restraint signal generating circuit 36 generates a minimum restraint signal whose magnitude is determined by the position of the slide arm of potentiometer R8. The purpose of minimum restraint signal generating circuit 36 is to ensure that restraint signal generator 16 generates a minimum restraint signal even when the magnitude of the primary and secondary winding currents in transformer T1 fall to very low values.

Rectifier circuits 32, 34 rectify the primary and secondary voltages $V_P$ and $V_S$, respectively, and apply the rectified signals to the cathodes of diodes D2 and D3, respectively. Significantly, rectifiers 32, 34 step up the voltage of the voltage signals $V_P$, $V_S$ by an amount equal to the voltage drop appearing across diodes D2, D3. As a result, the rectified voltage appearing at the anode of either diode D2, or diode D3 will be equal in magnitude to the input voltages $V_P$ or $V_S$ (whichever is instantaneously larger).

Since the structure and operation of the solid state full wave rectifiers 32, 34 are identical, only the structure and operation of rectifier 32 will be described. The inverting input terminal of operational amplifiers 38 receives the primary winding voltage $V_P$ via input resistor R1. During the positive swing of primary voltage $V_P$, the inverting input terminal of operational amplifier 38 also receives a second voltage signal from the operational amplifier. As will become apparent below, the effective input voltage to the inverting input terminal of operational amplifier 38 is always negative causing the output of operational amplifier 38 to remain positive. The positive voltage at the output of operational amplifier 38 forward biases diode D4, inserting resistor R3 into the feedback loop of operational amplifier 38 and causes operational amplifier 38 to operate as an inverting amplifier.

Operational amplifier 40 also operates as an inverting amplifier. Its effect on amplifier 38, however, (and therefore its effect on the output of rectifier 32) is determined by the instantaneous polarity of voltage $V_P$. When the voltage $V_P$ is positive, the output of operational amplifier 40 is negative and diode D5 is forward biased. In this condition, resistor R4 defines the feedback resistor for operational amplifier 40. The magnitude of resistors R2 and R4 are selected to be equal in order to insure that operational amplifier 40 operates as an inverting amplifier with a gain of 1 when the voltage $V_P$ is positive and diode D5 is forward biased. In this condition, $+V_P$ volts is applied to the inverting input terminal of operational amplifier 38 via resistor R1 and $-V_P$ volts is applied to the inverting input terminal of operational amplifier 38 via resistor R6. By selecting the magnitude of resistor R6 to be one half that of resistor R1, the effective voltage applied to the inverting input terminal of operational amplifier 38 will be $-V_P$ volts. Since the magnitude of resistors R1 and R3 are chosen to be equal, the output of operational amplifier 38 will be at $+V_P$ volts plus the voltage drop across diode D4.

When voltage $V_P$ poles negative, the output of operational amplifier 40 poles positive, back biasing diode D5 and forward biasing diode D6. In this state, resistor R5 defines the feedback resistor for amplifier 40. Since diode D5 is back biased, however, the output of operation amplifier 40 is not applied to the input of operation amplifier 38 and operational amplifier 40 does not effect the magnitude of the output of rectifier 32. In this case, operational amplifier 38 receives the negative voltage $V_P$ via resistor R1 only and the output of operational amplifier 38 will again be at $+V_P$ volts plus the voltage drop across diode D4. The voltage appearing at the output of full wave rectifier circuit 32 is applied to the output of restraint signal generator 16 via diode D2 (less the voltage drop across diode D2) whenever the instantaneous value of the output of full wave rectifier circuit 32 is greater than the instantaneous value of the output of full wave rectifier 34 and minimum restraint signal generating circuit 36. Similarly, the voltage appearing at the output of full wave rectifier circuit 34 is applied to the output of restraint signal generator 16 via diode D3 (less the voltage drop across diode D3) whenever the output of full wave rectifier circuit 34 is greater than the instantaneous value of both the output of full wave rectifier circuit 32 and the minimum restraint signal generating circuit 36. Accordingly, the output of restraint signal generator 16 is a positive voltage signal $V_R$ whose magnitude is representative of the larger of the primary and secondary winding circuits through windings P1, S1, respectively, at any given instant.

In contrast to the foregoing, prior art restraint signal generators utilize standard full wave bridge rectifiers which exhibit at least a fixed voltage drop. As a result, it was necessary to select the magnitude of the signals $V_P$ and $V_S$ to be sufficiently large to make this voltage drop insignificant. This led to large signal operation which adversely effected the size of the required current transformers. By utilizing solid state full wave rectifiers, the restraint signal generator 16 of the present invention utilizes relatively low magnitude input signals ($V_P$, $V_S$) and therefore can utilize smaller current transformers (12, 14).

The preferred structure of operate signal generator 18 is illustrated in FIG. 3. As shown therein, operate signal generator 18 comprises a pair of input resistors R9, R10, an operational amplifier 42 having a feedback resistor R11 connected between its output and inverting input terminals so as to cause operational amplifier 42 to operate as an inverting amplifier and a zero drop rectifier 46. Operational amplifier 42 is connected to operate as an inverting amplifier whose output $V_{VS}$ represents the vector sum of the input signals $V_P$ and $V_S$ (and therefore the vector sum of the primary and secondary winding currents). This output $V_{VS}$ is applied to the zero drop rectifier 46 which provides full wave rectification of vector sum signal $V_{VS}$ and generates a negative varying d.c. voltage $-V_O$ at its output whose magnitude is equal to the instantaneous absolute magnitude of the vector sum of input signals $V_P$ and $V_S$. Significantly, zero drop rectifier 46 is a solid state rectifier having an effective zero voltage drop so as to avoid stepping down the magnitude of the operate voltage. This is highly advantageous since it permits small signal operation and provides a true indication of the magnitude of the vector sum signal $V_{VS}$ with respect to the restraint voltage $+V_R$ in order to provide accurate percentage comparison between the operate and restraint voltages. One suitable zero drop rectifier 46 is illustrated in FIG. 5. It should be recognized by those skilled in the art that the operate signal $-V_O$ is a varying negative d.c. voltage equal to the negative absolute value of the vector sum signal $V_{VS}$.

As shown in FIG. 5, zero drop rectifier 46 includes a pair of operational amplifiers 48, 50 whose operation is determined by the polarity of vector sum signal $V_{VS}$. Accordingly, the operation of these amplifiers (and therefore the operation of zero drop rectifier 44) will be discussed separately for both the positive and negative swing of the vector sum signal.

During the positive swing of vector sum signal $V_{VS}$, a positive voltage is applied to the non-inverting input terminal of operational amplifier 48 via resistor R14 causing the output of amplifier 48 to pole positive. This positive voltage forward biases diode D7 and back biases diode D8. In this condition, operational amplifier 48 operates as a non-inverting amplifier and the positive vector sum signal $V_{VS}$ is applied to the inverting input of operational amplifier 50 via input resistor R30. This positive voltage causes the output of amplifier 50 to pole negative thereby forward biasing diode D9 and back biasing diode D10. In this condition, operational amplifier 50 operates as an inverting amplifier with resistor R15 defining its feedback path. By selecting the magnitudes of resistors R30 and R15 to be equal, the amplification of operational amplifier 50 will be unity and a negative d.c. voltage having a magnitude equal to the instantaneous magnitude of the vector sum signal $V_{VS}$ appears at the output of rectifier 44 via forward biased diode D9.

During the negative swing of vector sum signal $V_{VS}$, the output of operational amplifier 48 poles negative, back biasing D7 and forward biasing diode D8. The forward biased diode D8 causes resistor R16 to define a feedback path for operational amplifier 48 whereby operational amplifier 48 operates as a non-inverting amplifier. By selecting the value of resistors R14 and R16 to be equal, the amplification factor of amplifier 48 will be unity and a negative voltage equal in magnitude to the instantaneous value of the vector sum signal $V_{VS}$ appears at the output of rectifier 44 vector sum diode D8. The combined value of resistors R30 and R15 is also equal to that of resistor R16.

Prior art operate signal generators comprise a pair of operate transformers which form a T-current connection. To obtain this connection, a complex interconnection of tap blocks was required. The solid state operate a signal generator 18 of the present invention avoids the need for such operate transformers and thereby significantly reduces the weight of the differential relay 10 while at the same time significantly simplifying the interconnections thereof.

Referring again to FIG. 1, the restraint and operating signals generated by restraint and operate signal generators 16, 18 are applied to fast trip circuit 20 which generates a fast trip signal FT when the magnitude of the operate signal $-V_O$ rises above a first predetermined percentage of the restraint signal $+V_R$. This predetermined percentage is sufficiently great to take into account the current transformer ratio mismatch and the ratio change by tap changing under load. Adjustment of the first predetermined percentage is controlled by a difference circuit 26 whose preferred structure, is illustrated in FIG. 4. Difference circuit 26 receives the restraint and operating voltages $+V_R$ and $-V_0$ and generates a fast trip enable signal FTE whenever the magnitude of $-V_O$ exceeds said first predetermined percentage of $+V_R$, which percentage is determined by the position of the slide arm of potentiometer R12. The heart of difference circuit 26 is an operational amplifier 44 connected to operate as a comparator. Since the non-inverting input terminal of operational amplifier 44 is grounded, the output of operational amplifier 44 will be at its positive saturation value whenever the effective voltage applied to its inverting input terminal is negative and will be at negative saturation value whenever the effective voltage applied to its inverting input terminal is positive. The inverting input terminal of amplifier 44 receives the positive restraint voltage $+V_R$ generated by restraint signal generator 16 via resistor R13 and the inverting input terminal of amplifier 44 receives the negative operate voltage $-V_O$ via potentiometer R12.

Whenever the magnitude of the operating voltage $-V_O$ rises above the first predetermined percentage of the restraint voltage $+V_R$, the effective voltage applied to the inverting input of operational amplifier 44 is negative and the output of amplifier 44 jumps to its positive saturation value. In this condition, capacitor C1 charges to a positive value via resistors R17, R18. This positive value represents the fast trip enable signal FTE.

Whenever the magnitude of the negative rectified operate voltage $-V_O$ (and therefore the vector difference between the currents in the primary and secondary windings of transformer T1) falls below the first predetermined percentage, the effective voltage applied to the inverting input terminal of operational amplifier 14 is positive causing the output of amplifier 44 to switch its negative saturation value. By properly selecting the values of resistors R17 and R18, the charge across capacitor V1 can be reduced zero volts a.c. which represents the absence of the fast trip enable signal FTE.

Returning now to FIG. 1, the fast trip enable signal FTE generated by difference circuit 20 is applied to gate circuit 28. Gate circuit 28 appies this signal to tripping circuit 24 (in the form of fast trip signal FT) whenever the gate 28 is not disabled by the absence of a harmonic restraint signal HR. The harmonic restraint signal HR is generated by a harmonic restraint circuit 30 which detects the harmonic content of the currents in the primary and secondary windings of transformer T1 and generates the harmonic restraint signal HR whenever the magnitude of the harmonic component of the primary and secondary winding currents does not exceed the magnitude of the fundamental component of those currents beyond a second predetermined percentage. In this way, fast trip circuit 20 distinguishes between the high magnitizing in-rush currents, which have a high harmonic content and which occur when the power source is first applied to the transformer T1, and the internal fault currents which do not contain such harmonics.

Figure 6:
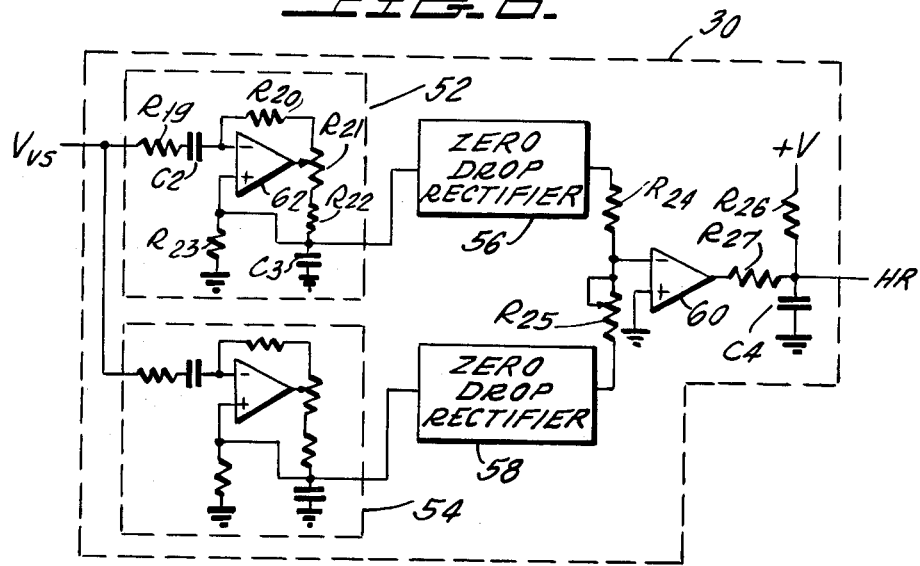
FIG. 6 is a circuit diagram of the harmonic restraint circuit of FIG. 1.

One possible harmonic restraint circuit 30 is illustrated in FIG. 6. As shown therein, harmonic restraint circuit 30 comprises a fundamental frequency filter circuit 52, a harmonic frequency filter circuit 54, a pair of zero drop rectifiers 56, 58 and an operational amplifier 60. Fundamental frequency filter circuit 52 comprises operational amplifier 62, resistors R19-R23 and capacitors C2-C3 and defines an active bandpass filter for the fundamental frequency of the vector sum signal $V_{VS}$ (and therefore the fundamental frequency of the current in the primary and secondary windings of transformer T1). Typically, fundamental frequency filter circuit 52 defines a 60 hertz bandpass filter. Variable resistor R21 and feedback resistors R20, R22 are connected to cause operational amplifier 62 to operate as a current inversion negative emmitance inverter. So connected, the high gain of amplifier 62 forces virtually zero volts between its inverting and non-inverting terminals. Consequently, the voltage at the non-inverting input terminal and the output terminal of amplifier 62 is approximately equal. At the same time, the current at the output terminal is inverted with respect to the current at the inverting input terminal. As a result, the capacitor C3 acts as an inductor. This is highly significant since it obviates a need for an inductor in the bandpass filter thereby decreasing the weight of the relay 10.

Harmonic frequency filter circuit 54 is identical in structure to filter circuit 52 but the magnitudes of the various capacitors and resistors are altered in order that filter circuit 54 operates as an active bandpass filter for the second harmonic frequency of the vector sum signal $V_{VS}$. Since the second harmonic frequency contains substantially all the harmonic components it is sufficient to compare the second harmonic frequency component with the fundamental frequency component. While active filter circuits 52, 54 have been described as bandpass filters, it should be noted that other active filter circuits could be used. In fact, a high pass filter could be substituted for second harmonic bandpass filters so that all harmonics restrain. This approach is preferable where the protected transformer T1 may be subjected to over-excitation. In any case, the harmonic component passed by filter circuit 54 and the fundamental component passed by filter circuit 52 are applied to zero drop rectifier 58 and 57, respectively.

Zero drop rectifier 56 is identical in structure and operation to zero drop rectifier 44 illustrated in FIG. 5 and described above. Zero drop rectifier 58 is of substantially the same construction with the exception that the polarity of diodes D7-D10 is reversed. As such, the signal appearing at the output of rectifier 56 is a negative signal whose magnitude is equal to the instantaneous magnitude of the fundamental frequency component of vector difference signal $V_{VS}$ (and therefore of the currents in windings P1, S1) while the output of zero drop rectifier 58 is a positive signal whose magnitude is equal to the second harmonic component of vector difference signal $V_{VS}$ (and therefore the currents in windings P1, S1).

The outputs of rectifiers 56, 58 are applied to the inverting input terminal of operational amplifier 60 via resistors R24, R25, respectively. Resistor R25 is a potentiometer which determines the second predetermined percentage which determines the instant at which the harmonic restraint signal HR is no longer generated. As long as the second harmonic component of the vector sum signal $V_{VS}$ is less than the second predetermined percentage of the fundamental component of the vector sum signal $V_{VS}$, the effective voltage applied to the inverting terminal of operational amplifier 60 will be negative causing the output of operational amplifier 60 to pole positive. In this condition, capacitor C4 is permitted to charge to a predetermined positive value which represents the presence of the restraint signal HR. When the magnitude of the first harmonic component of the vector sum signal $V_{VS}$ rises above the second predetermined percentage determined by the slide arm of potentiometer R25, the effective voltage applied to the inverting input terminal of operational amplifier 60 is positive causing the output of amplifier to pole negative. By properly selecting the magnitude of resistors R26 and R27, it is possible to insure that capacitor C4 discharges to a relatively zero volts d.c. representing the absence of the harmonic restraint signal HR.

Figure 7:
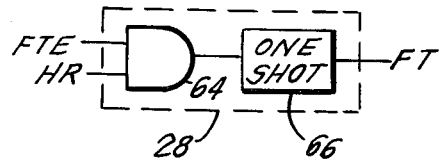
FIG. 7 is a circuit diagram of the gate circuit of FIG. 1.

Referring again to FIG. 1, the fast trip enable and harmonic restraint signals generated by circuits 26 and 30 are applied to gate circuit 28. One possible gate circuit 28 is illustrated in FIG. 7. As shown therein, gate circuit 28 includes an AND gate 64 and a retriggerable one shot 66. The input terminals of AND gate 64 receive the fast trip enable and harmonic restraint signals, FTE, HR, respectively, and generates a binary "1" at its output whenever difference signal 26 generates the fast trip enable signal FTE and harmonic restraint circuit 30 generates the harmonic restraint signal HR. A binary 1 appearing at the output of AND gate 64 enables a retriggerable one shot 66 which generates a positive going pulse of a predetermined duration, which pulse respresents the fast trip signal FT. Since one shot 66 is retriggerable, its output will stay at a predetermined d.c. magnitude as long as the trigger pulses generated by AND gate 64 are generated at a frequency which is greater than the reciprocal of the duration of the pulse generated by one shot 66. The parameters of the one shot 66 are preferably chosen such that its output will stay at the predetermined d.c. level whenever the magnitude of the operate signal $V_O$ rises above the first predetermined percentage of the restraint signal $V_R$. Whenever harmonic restraint signal 30 ceases to generate the harmonic restraint signal HR, AND gate 64 is disabled and gate circuit 28 cannot generate the fast trip signal FT.

The fast trip signal FT is applied to tripping circuit 24 which is responsive to both the fast trip signal FT generated by fast trip circuit 20 and to an instantaneous trip signal IT generated by instantaneous trip circuit 22. Whenever tripping circuit 24 receives either of these signals, it disconnects tripping circuit T1 from its power source in a well known manner.

Figure 8:
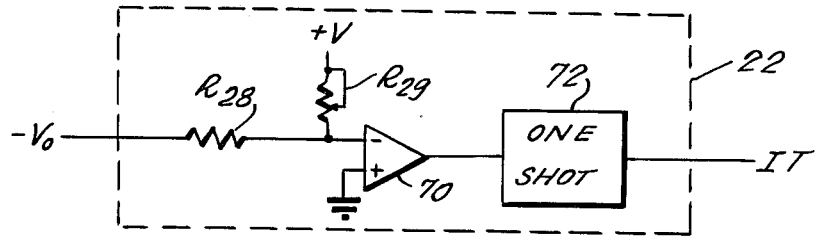
FIG. 8 is a circuit diagram of the instantaneous trip circuit of FIG. 1.

Instantaneous trip circuit 22 receives the operate signal $-V_O$ from operate signal generator 18 and generates the instantaneous trip signal IT whenever the magnitude of the operate signal rises above a predetermined value (typically 10 times the tap setting of transformers 12, 14). The preferred structure of instantaneous trip circuit 22 is illustrated in FIG. 8. Instantaneous trip circuit 22 includes a pair of resistors R27, R28, an operational amplifier 70 and a retriggerable one shot 72. The negative output at the output of rectifier 46 tends to pole the output of operational amplifier 70 (which is connected to operate as a comparator) in the positive direction. The positive biasing voltage $+V$ applied to potentiometer R29 tends to pole the output of amplifier 78 negative. Since one shot 72 is designed to generate a single pulse of predetermined duration at its output (which pulse represents the instantaneous trip signal IT) whenever the output of amplifier 70 poles positive, the voltage at the output of rectifier 46 tends to cause circuit 22 to generate the trip signal IT while the constant biasing voltage $+V$ tends to retard the generation of the trip signal. In this manner, instantaneous trip circuit 22 will generate the instantaneous trip signal IT whenever the magnitude of the operate voltage $-V_O$ increases beyond the predetermined value determined by the setting of the slide arm potentiometer 29.

As used herein, the term zero drop rectifier circuit shall refer to a rectifier circuit which is capable of rectifying a.c. signal of less than 0.2 volts.

The present invention may be embodied in other specific forms without departing from the spirit or essential attributes thereof and, accordingly, reference should be made to the appended claims, rather than to the foregoing specification as indicating the scope of the invention.

What is claimed is:

1. A transformer differential relay for monitoring the magnitude of the currents in first and second windings of a power transformer and for disconnecting said power transformer from a power source supplying said power transformer when the relative magnitude of said currents indicate the presence of an internal fault in said power transformer, said relay comprising:
   first current transformer means for generating a first voltage signal representative of the magnitude of said current flowing through said power transformer first winding;
   second current transformer means for generating a second voltage signal representative of the magnitude of said current flowing through said power transformer second winding;
   a solid state restraint signal generator responsive to said first and second winding voltage signals for generating a restraint signal representative of the magnitude of the larger of said first and second currents at each measurement instant;
   a solid state operate signal generator responsive to said first and second winding voltage signals for generating an operate signal representative of the magnitude of the vector sum of said currents flowing through said power transformer first and second windings; and
   means for disconnecting said power transformer from said power source when the magnitude of said operate signal rises above a predetermined percentage of said restraint signal.

2. The transformer differential relay of claim 1, wherein said solid state operate signal generator comprises:
   an operational amplifier; and
   means for connecting said operational amplifier to said first and second current transformer means in such a manner that said operational amplifier generates an output signal representative of the vector sum of said currents flowing through said first and second windings.

3. The transformer differential relay of claim 2, wherein said operate signal generator further includes a zero drop rectifier circuit coupled to said operational amplifier for rectifying said output signal generated by said operational amplifier.

4. The transformer differential relay of claim 1, wherein said first and second current transformer means generate said first and second voltage signals in such a manner that the magnitude of said first and second voltage signals are equal in the absence of an internal fault in said power transformer.

5. The transformer differential relay of claim 4, wherein the magnitude of said restraint signal is equal to the magnitude of the larger of said first and second voltage signals at each measurement instant.

6. The transformer differential relay of claim 5, wherein said solid state restraint signal generator comprises:
   a first solid state full-wave rectifier circuit for generating an output signal whose magnitude differs from the absolute magnitude of said first winding voltage signal by a predetermined voltage;
   a second solid state full-wave rectifier for generating an output signal whose magnitude differs from the absolute magnitude of said second voltage signal by said predetermined voltage;
   a first diode coupled between said first solid state full-wave rectifier and a voltage summing junction, the rated voltage drop across said first diode when said first diode is forward biased equal to said predetermined voltage; and
   a second diode coupled between said second solid state full-wave rectifier and said voltage summing junction, the rated voltage drop across said second diode when said second diode is forward biased being equal to said predetermined voltage, the polarity of said first and second diodes with respect to said first and second solid state full-wave rectifiers and with respect to said summing junction being such that the magnitude of the voltage appearing at said summing junction is equal to the magnitude of said first and second voltage signals when said first and second diodes are forward biased, respectively, whereby the voltage of said summing junction defines said restraint signal.

7. The transformer differential relay of claim 6, wherein said solid state restraint signal generator further includes:
   means for generating a minimum restraint signal; and
   a third diode connected between said means for generating said minimum restraint signal and said summing junction, the polarity of said third diode being the same as that of said first and second diodes with respect to said summing junction.

8. The transformer differential relay of claim 6, wherein said solid state operate signal generator comprises:
   an operational amplifier; and
   means for connecting said operational amplifier to said first and second current transformer means in such a manner that said operational amplifier generates an output signal representative of the vector sum of said currents flowing through said first and second windings.

9. The transformer differential relay of claim 8, wherein said operate signal generator further includes a zero drop rectifier circuit coupled to said operational amplifier for rectifying said output signal generated by said operational amplifier.

10. The transformer differential relay of claims 3, 6 or 8, wherein said means for disconnecting said power transformer comprises:
    fast trip circuit means for generating a fast trip signal when the magnitude of said operate signal rises above said predetermined percentage of said restraint signal; and
    trip circuit means for disconnecting said power transformer from said power source responsive to the generation of said fast trip signal.

11. The transformer differential relay of claim 10, wherein said fast trip circuit means further includes means for inhibiting the generation of said fast trip signal when the magnitude of the harmonic component of said currents through said first and second windings of said power transformer rises above a second predetermined percentage of the magnitude of the fundamental component of said currents flowing through said first and secondary winding of said power transformer.

12. The transformer differential relay of claim 11, wherein said fast trip circuit means comprises:
    difference circuit means responsive to said restraint and operate signals for generating a fast trip enable signal when the magnitude of said operate signal rises above said first predetermined percentage of said restraint signal;
    harmonic restraint circuit means for generating a harmonic restraint signal when the magnitude of said harmonic component of said currents flowing through said first and second windings of said power transformer remains below said second predetermined percentage of said fundamental component of said currents flowing through said first and second windings of said power transformers; and
    gate circuit means for generating said fast trip signal responsive to the generation of both said fast trip enable signal and said harmonic restraint signal.

13. The transformer differential relay of claim 12, wherein said harmonic restraint circuit means comprises:
    a first solid state filter circuit for generating an output signal whose magnitude is representative of the magnitude of said fundamental component of said currents flowing through said first and second windings of said power transformer;
    a second solid state filter for generating an output signal whose magnitude is representative of the magnitude of said harmonic component of said currents flowing through said first and second windings of said power transformer; and
    means coupled to said first and second solid state filters for generating said harmonic restraint signal whenever the magnitude of the signal generated by said first and second filters indicates that the magnitude of said harmonic component of said currents flowing through said first and second windings of said power transformer is below said second predetermined percentage of said fundamental component of said currents flowing through said secondary windings of said power transformer.

14. The transformer differential relay of claim 13, wherein each of said first and second filters include an operational amplifier connected to operate as a current inversion negative emittance inverter.

15. The transformer differential relay of claim 14, wherein said second filter is a bandpass filter which passes only the second harmonic frequency component of said currents flowing through said first and second windings of said power transformer.

16. The transformer differential relay of claim 12, wherein said means for disconnecting said power transformer further comprises instantaneous trip circuit means for generating an instantaneous trip signal when the magnitude of said operate signal rises above a predetermined value and wherein said trip circuit means disconnects said power transformer from said power source responsive to the generation of said fast trip signal as well as to the generation of said instantantaneous trip signal.

* * * * *